UNITED STATES PATENT OFFICE 2,294,211

HEAT STABLE THERMOPLASTIC COATING MATERIALS

David A. Rothrock, Philadelphia, Pa., assignor to The Resinous Products & Chemical Company, Philadelphia, Pa.

No Drawing. Application April 15, 1940, Serial No. 329,736

7 Claims. (Cl. 260—14)

This invention relates to a method of stabilizing resinous compositions containing cellulose ethers. More particularly it concerns the addition of organic esters of phosphorous acid to resinous coating compositions containing cellulose ethers, especially ethyl cellulose, so that changes in color, clarity, homogeneity, and viscosity of the coating composition are retarded.

In the application of molten resins to paper, foil or other sheet materials it has been found that modification of the resin is essential for practical success. For such modification there have been mixed with the resin various waxes and/or plasticizers, and, more recently, cellulose ethers such as ethyl cellulose. The addition of the cellulose derivative improves greatly the film-forming characteristics of the molten mass, imparting toughness and flexibility to the coating, and improving heat-sealing characteristics.

These coatings are usually applied to the surface of sheet materials, such as foil, paper, or other fibrous materials, by means of rolls which are supplied with molten material from trays or pans. The coating material is maintained for long periods of time at temperatures (80–165° C.), which are above the melting point of the mixture. On exposure of the melted material in the trays and on the rolls to air there is a marked tendency for oxidative and other changes to occur which are particularly troublesome when a cellulose ether is one of the ingredients of the mixture. These changes are manifested by development of color, an increase in viscosity, separation of material, often in lumps, and a development of haze or turbidity. These changes interfere with the proper application of melted coatings and decrease their utility.

The object of this invention is to improve the stability of resinous coating compositions containing a cellulose ether. This object includes retarding the rate of discoloration, of increase in viscosity, and/or of development of turbidity. It is a further object to provide resinous coating compositions for application in a molten condition which will give uniform, continuous coverage of sheet materials. It is also an object to provide a means of utilizing the advantages of cellulose ethers in hot melt coating compositions without the disadvantages which would otherwise result.

It has been found that the addition of a small amount of an organic ester of phosphorous acid to a resinous coating composition containing a solvent-soluble cellulose ether preserves markedly the initial color, clarity, homogeneity, and viscosity. If desired, the coating composition may be prepared by fusing together the usual ingredients along with the organic ester of phosphorous acid. Alternatively, a hot melt coating composition of the type containing a cellulose ether as used heretofore may be melted prior to application and a small amount of a phosphorous acid ester then added thereto.

The optimum concentration of the phosphite is between about 0.2% and 0.6%. While lower concentrations give a noticeable effect, they are not always sufficiently effective or effective over a long enough time. Higher concentrations may be used but usualy offer no economic return.

Any of the organic esters of phosphorous acid may be used, such as the aryl phosphites, including triphenyl phosphite, tricresyl phosphite, tributylphenyl phosphite, trioctylphenyl phosphite, trinaphthyl phosphite, or the analogous thiophosphites, or the nitroaryl phosphites, of which trinitrophenyl phosphite is an example, or esters such as the trialkyl, dialkyl, or monoalkyl phosphites, including trimethyl phosphite, triethyl phosphite, trioctyl phosphite, dimethyl phosphite, dibutyl phosphite, monoamyl phosphite, etc. These phosphites may be prepared from phenols or alcohols and phosphorus trichloride. The esters of monohydric phenols or alcohols are preferred, but esters of polyhydric compounds, such as glycerine or glycol, are similarly effective.

In practicing this invention a phosphite ester is used in a composition which is based on a thermoplastic resin and cellulose ether. Additional ingredients usually include a wax or plasticizer or both a wax and a plasticizer. The resins which are useful are of various kinds, including alkyd-type resins such as glycerol-maleic acid condensates modified with rosin, dihydric dinuclear hydroaromatic alcohol-carboxylic acid condensates, resins from hydrogenated dianes, such as the product obtained by heating hydrogenated dihydroxy diphenyl dimethyl methane or reacting it with urea-formaldehyde, as disclosed in U. S. application Serial No. 263,676, filed March 23, 1939, the harder acrylates such as polymeric methyl methacrylate, terpene-phenol condensates, phenolic resins such as the alkyl-phenol formaldehyde condensates of which the oil-soluble butyl-phenol- formaldehyde condensates are particularly useful examples, etc. In addition to the resins, there are often used waxes such as natural waxes, including candelilla, carnauba, beeswax, Japan, montan, etc., the so-called synthetic waxes, including esters of montanic and similar long-chained acids, hydrogenated esters, like hydrogenated castor oil, etc., and mineral waxes such as paraffin and microcrystalline wax. There may also be used plasticizers, such as esters like dibutyl phthalate, diamyl phthalate, tricresyl phosphate, etc., or ethers of high boiling point like diethoxydiethyl phthalate, or castor oil, and its blown derivatives, or soft alkyd resins modified with a high percentage of castor oil, etc.

In addition to the above materials, the most useful hot melt coating compositions contain an organic solvent soluble cellulose ether, such as ethyl cellulose, isopropyl cellulose, benzyl cellulose, ethyl-benzyl cellulose, butyl cellulose, butyl-ethyl cellulose, dodecyloxymethyl cellulose, and the like. It is generally desirable that the cellulose ether be of the low viscosity type. While resin-wax compositions, as described above, discolor or degrade slowly on prolonged heating, as soon as such mixtures are further modified with a cellulose ether, the tendency to discolor and otherwise change becomes pronounced due to oxidation and/or decomposition. Above 100° C., which is usually a minimum temperature for reducing viscosities of melts containing cellulose ethers to a workable consistency, the rate of change is appreciable unless an organic ester of phosphorus acid is added. In the range of temperatures of 140–165° C., where the average hot melt coating containing a relatively large proportion of ethyl cellulose is applied, undesirable changes occur very rapidly unless inhibited with an ester of phosphorus acid. The organic phosphites are also highly effective in preserving the essential qualities of the resinous coatings after application.

Typical coating compositions which are successfully inhibited in accordance with this invention are shown in the following examples.

Example 1

A resin was prepared by heating one part of maleic anhydride, seven parts of rosin, and sufficient glycerine to esterify the acids. A mixture of 50 parts of this resin, 20 parts of highly hydrogenated castor oil, 7 parts of paraffin (M. P. 150° F.), 15 parts of blown castor oil, and 13 parts of low viscosity ethyl cellulose was fused to a clear melt at 150° C. Six equal samples of the melt were taken and placed in Petri dishes so as to give a large ratio of surface to volume. Five of the samples were treated with small amounts of various supposedly stabilizing materials and then all six dishes were maintained in an oven at 150° C. for 15 hours. Results were as follows:

| Sample | Material added | Per cent | Examination after 15 hrs. | |
|---|---|---|---|---|
| | | | Color | Appearance |
| a | None | | 17+ | Hazy, sl. gel. |
| b | X | 1.0 | 18+ | Turbid, some gel. |
| c | Y | 1.0 | 18+ | Hazy. |
| d | Triphenyl phosphate | 1.0 | 17− | Hazy. |
| e | Triphenyl phosphite | 1.0 | 14 | Clear. |
| f | Triphenyl phosphite | 0.5 | 14 | Clear. |

X was a commercial anti-skinning agent claimed to be an effective anti-oxidant for paints. Y was another commercial anti-oxidant also recommended for preventing skinning of paint. Colors were measured on the paint and varnish scale.

Example 2

There were fused together at 150° C. 20 parts of the same resin shown in Example 1, 25 parts of hydrogenated castor oil, 20 parts of paraffin, 15 parts of castor oil, and 10 parts of solvent-soluble ethyl cellulose. To one sample tricresyl phosphite was added to the extent of 1%; to another no preservative was added. After the samples had been heated for 15 hours at 150° C. in flat dishes, the compositions were examined. The sample free from preservative had acquired a color of 16 on the paint and varnish scale. The preserved, heated sample had a color of 12, while an unheated sample had a color of 10. During the heating the uninhibited sample became very turbid and increased in viscosity while the preserved sample remained clear and fluid.

Example 3

A coating composition was prepared by heating together 45 parts of the resin shown in Example 1, 28 parts of hydrogenated castor oil, 12 parts of dibutyl phthalate, and 15 parts of benzyl cellulose. The heat-stability of this composition was compared to that of a similar preparation to which 0.5 part of triphenyl phosphite was added. The samples, as before, were heated in an oven at 150° C. for 15 hours. The melt containing the phospite ester had a color of 13, while the uninhibited sample had a color over 15. The development of turbidity in the unstabilized sample was marked.

Example 4

240 parts of heat-treated perhydro diphenylol propane and 74 parts of phthalic anhydride were heated with stirring at 200° C. for about 6 hours to give a brittle, pale straw-colored resinous polyester. 40 parts of this polyester, 25 parts of hydrogenated castor oil, 7 parts of carnauba wax, 17 parts of paraffin, and 11 parts of low viscosity ethyl cellulose were then melted together to give a hot melt coating with very favorable application properties. As before, samples of this coating composition were tested in flat dishes in an oven. An uninhibited sample reached a color of 15 after 15 hours of heating, while samples containing 0.5% of triphenyl phosphite or tricresyl phosphite had a color of about 12. The original color was about 10.

This invention provides a simple but effective method of stabilizing resinous compositions based on a thermoplastic resin and a cellulose ether, particularly when these compositions are applied in a molten condition. By stabilizing against changes in color, viscosity, and homogeneity better economy is obtained in the use of hot melt coatings and more uniform results over long periods of operation.

I claim:

1. A hot melt coating composition comprising a synthetic, thermoplastic resin substantially free of oxidizable oils, an organic solvent-soluble cellulose ether, and from about 0.2% to about 1% of an organic ester of phosphorous acid.

2. A hot melt coating composition comprising a synthetic, thermoplastic resin substantially free of oxidizable oils, a wax, a plasticizer, an organic solvent-soluble ethyl cellulose, and from about 0.2% to about 1% of an organic ester of phosphorous acid.

3. A hot melt coating composition which comprises a synthetic thermoplastic resin which is compatible with cellulose ether, a plasticizer, an organic solvent-soluble cellulose ether, and from about 0.2% to about 0.6% of a triaryl ester of phosphorous acid.

4. A composition according to claim 3 in which the organic ester is triphenyl phosphite.

5. The process of stabilizing a fusible, synthetic, thermoplastic, resinous hot melt coating composition containing an organic solvent-soluble cellulose ether, which comprises incorporating in said composition from about 0.2% to about 1% of an organic ester of phosphorous acid, the amount of ester so incorporated being sufficient to retard substantially changes in color, viscosity, and homogeneity of the composition.

6. The process of stabilizing a hot melt coating composition, substantially free of oxidizable oils, containing a synthetic, thermoplastic resin, wax, plasticizer, and ethyl cellulose which comprises incorporating in said composition from about 0.2% to about 1% of a triaryl phosphite.

7. The process of claim 6 in which the triaryl phosphite is triphenyl phosphite.

DAVID A. ROTHROCK.